(12) United States Patent
Yebka et al.

(10) Patent No.: US 10,971,780 B2
(45) Date of Patent: Apr. 6, 2021

(54) RELEASABLE BATTERY PACKAGE

(71) Applicant: Lenovo (Singapore) Pte. Ltd., Singapore (SG)

(72) Inventors: Bouziane Yebka, Apex, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 142 days.

(21) Appl. No.: 15/940,503

(22) Filed: Mar. 29, 2018

(65) Prior Publication Data
US 2019/0305266 A1    Oct. 3, 2019

(51) Int. Cl.
| | |
|---|---|
| *H01M 2/00* | (2006.01) |
| *H01M 50/209* | (2021.01) |
| *H01M 10/052* | (2010.01) |
| *G06F 1/16* | (2006.01) |
| *G06F 1/26* | (2006.01) |
| *C09J 7/30* | (2018.01) |
| *H01M 50/124* | (2021.01) |

(52) U.S. Cl.
CPC .............. *H01M 50/209* (2021.01); *C09J 7/30* (2018.01); *G06F 1/1635* (2013.01); *G06F 1/26* (2013.01); *H01M 10/052* (2013.01); *H01M 50/124* (2021.01); *C09J 2203/33* (2013.01); *C09J 2301/124* (2020.08); *C09J 2301/18* (2020.08)

(58) Field of Classification Search
CPC ...... G06F 1/26; G06F 1/1635; H01M 2/0287; H01M 2/1066; H01M 10/052; C09J 2203/33
See application file for complete search history.

(56) References Cited

U.S. PATENT DOCUMENTS

| | | | | |
|---|---|---|---|---|
| 2003/0232236 | A1* | 12/2003 | Mitchell | H01M 2/0212 429/56 |
| 2012/0301777 | A1* | 11/2012 | Ahn | H01M 2/0212 429/163 |
| 2015/0349375 | A1* | 12/2015 | Takahashi | H01G 9/048 429/7 |
| 2018/0007181 | A1* | 1/2018 | Lee | H05K 5/04 |
| 2018/0076493 | A1* | 3/2018 | Park | H01M 2/1077 |
| 2019/0097185 | A1* | 3/2019 | Malgioglio | H01M 2/0267 |

* cited by examiner

*Primary Examiner* — Cynthia H Kelly
*Assistant Examiner* — Monique M Wills
(74) *Attorney, Agent, or Firm* — Brian J. Pangrle

(57) ABSTRACT

A device can include a processor; memory accessible by the processor; a battery bay that includes a first surface; a battery package disposed in the battery bay and operatively coupled to the processor, where the battery package includes a second surface; and materials disposed between the first surface and the second surface, where the materials include an adhesive and a thermoplastic.

19 Claims, 11 Drawing Sheets

Assembly 400

RELEASABLE BATTERY PACKAGE

TECHNICAL FIELD

Subject matter disclosed herein generally relates to batteries.

BACKGROUND

A battery can include one or more electrochemical cells. As an example, an electrochemical cell can be a lithium-ion cell. Such a cell may be installed in a battery bay of a device such as, for example, a computing device.

SUMMARY

A device can include a processor; memory accessible by the processor; a battery bay that includes a first surface; a battery package disposed in the battery bay and operatively coupled to the processor, where the battery package includes a second surface; and materials disposed between the first surface and the second surface, where the materials include an adhesive and a thermoplastic. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
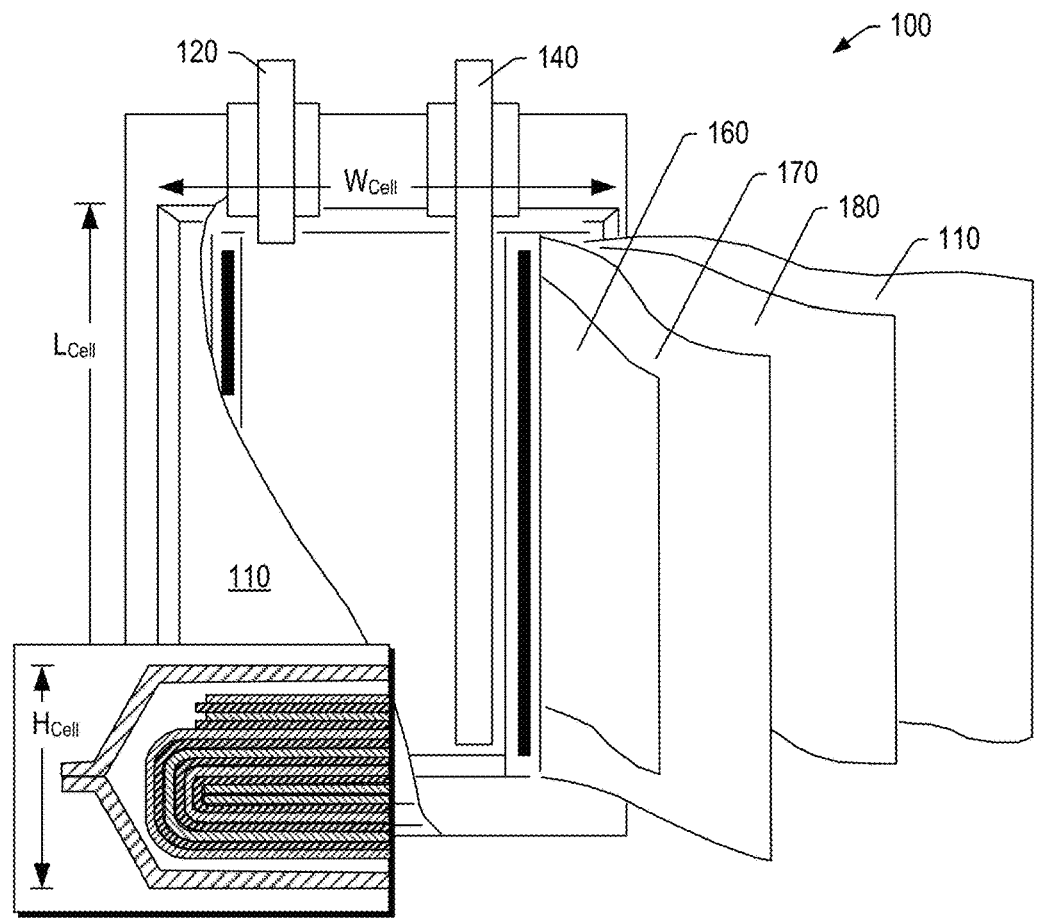
FIG. 1 is a diagram of an example of a battery and an example of circuitry.
Figure 1:
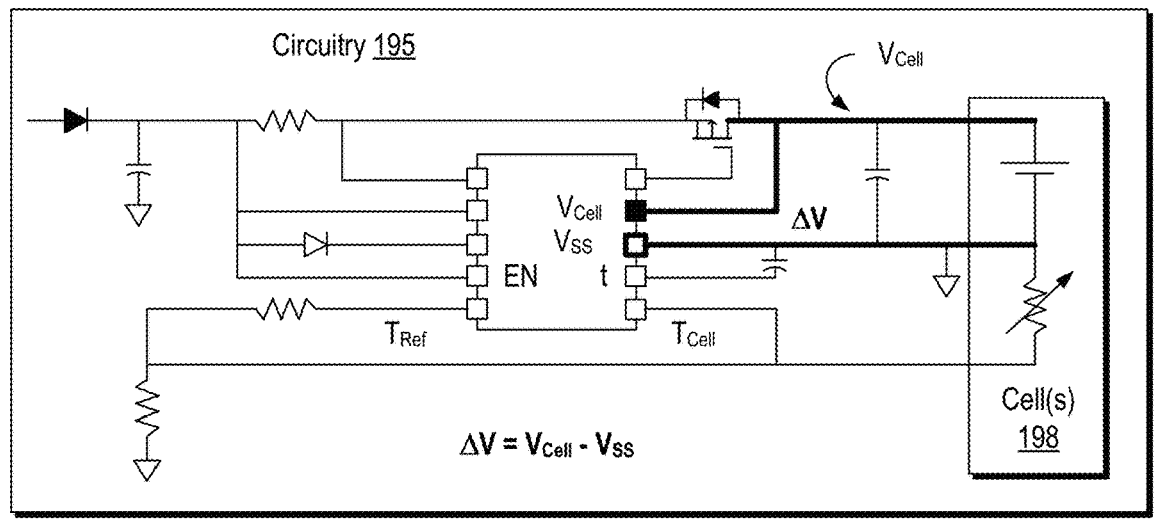

FIG. 1 shows an approximate cut-away view of an example of a battery 100 that includes a casing 110 and a positive tab 120 and a negative tab 140, for example, to operatively couple the battery 100 to circuitry. The casing 110 may include a cell region defined by a cell length ($L_{Cell}$), a cell width ($W_{Cell}$) and a cell height ($H_{Cell}$). As an example, the cell region may include one or more electrochemical cells. As an example, an electrochemical cell may be formed in part by a cathode 160, a separator 170 and an anode 180. Such components may be "folded", for example, to form a stack (e.g., "jelly roll") that may be housed in the cell region of the casing 110. As shown in the example of FIG. 1, in an approximate cross-sectional view, the height ($H_{Cell}$) of the cell region of the casing 110 may be defined in part by thicknesses of the cathode 160, the separator 170 and the anode 180 as well as, for example, by stacking of such components (e.g., winding in a roll or other configuration). As an example, a cathode formed of electrode material, an anode formed of electrode material and a separator formed of separator material along with collector materials may be layered and stacked, for example, by folding in a zigzag orientation, folding in a clockwise roll orientation, folding in a counterclockwise roll orientation, etc.

As an example, a cell can include an anode collector material that includes, for example, copper; an anode electrode material that includes lithium and carbon (e.g., $Li_yC$); a separator material configured for passage of lithium ions (e.g., in electrolyte); a cathode electrode material that includes lithium and metal oxide (e.g., $Li_{1-x}CoO_2$); and a cathode collector material that includes, for example, aluminum. While carbon, cobalt, copper and aluminum are mentioned, other materials may be employed to form a lithium-ion cell.

As to the terms "anode" and "cathode", these may be defined based on discharge, for example, where lithium ions migrate in a direction from a carbon-based matrix towards a metal oxide-based matrix. In other words, when a lithium-ion based cell is discharging, a positively charged lithium ion may be extracted from anode electrode material (e.g., graphite lattice) and inserted into cathode electrode material (e.g., into a lithium containing compound); whereas, when such a cell is charging, the reverse process may occur.

As an example, positive electrode material (e.g., cathode electrode material) may include $LiCoO_2$, $LiMn_2O_4$ or other compound. As an example, separator material may include a conducting polymer electrolyte (e.g. polyethyleneoxide "PEO", etc.). For example, a separator material may include polymer that provides for conduction of lithium ions (e.g., a lithium-ion conductive polymer material). As an example, negative electrode material (e.g., anode electrode material) may include ionizable lithium metal, a carbon-lithium intercalation compound, etc.

As an example, a lithium-ion battery may include one or more cells where each cell includes an anode, a cathode and electrolyte, which may be a polymeric material or provided in a polymeric matrix. As an example, a cell may include an anode electrode material that includes carbon, a cathode electrode material that includes a metal oxide, and a separator material that includes polymer.

As an example, active electrode particles may be for a cathode to form cathode electrode material. For example, consider particles that include one or more of lithium cobalt oxide ($LiCoO_2$), lithium nickel oxide ($LiNiO_2$), lithium manganese oxide ($LiMn_2O_4$), and lithium iron phosphate ($LiFePO_4$).

As an example, positive active electrode particles may include lithium and metal oxide, for example, represented by $Li_xM^1{}_yM^2{}_{1-y}O_2$ where $0.4 \le x \le 1$; $0.3 \le y \le 1$; $M^1$ is at least one selected from the group consisting of Ni and Mn; and $M^2$ is at least one selected from the group consisting of Co, Al, and Fe. As an example, positive active electrode particles may include lithium and metal oxide, for example, be represented by one of the following: $LiNi_xCo_yAl_zO_2$, where $0.7 \le x \le 1$; $0 \le y \le 0.3$; $0 \le z \le 0.03$; and $0.9 \le x+y+z \le 1.1$; $LiNi_xCo_yMn_zO_2$, where $0.3 \le x \le 0.6$; $0 \le y \le 0.4$; $0.3 \le z \le 0.6$; and $0.9 \le x+y+z \le 1.1$; $Li_xMn_zO_2$, where $0.4 \le x \le 0.6$; and $0.9 \le z \le 1$; or $LiFe_{x-}Co_yMn_zO_2$, where $0.3 \le x \le 0.6$; $0.1 \le y \le 0.4$; $0.3 \le z \le 0.6$; and $0.9 \le x+y+z \le 1.1$.

As an example, active electrode particles may be for an anode to form anode electrode material. For example, consider particles that include one or more of carbon lithium and lithium titanate. As to lithium titanate, consider, for example: $Li_2TiO_3$; $Li_4TiO_{12}$; $Li_4Ti_5O_{12}$.

As an example, a cell may include electrolyte in a polymeric matrix. For example, consider an electrolyte that includes $Li(ClO_4)_2$ in polycarbonate/tetrahydrofuran (PC/THF) (e.g., about 0.4 M) or other polymeric matrix.

FIG. 1 also shows an example of circuitry 195 for managing one or more electrochemical cells 198. As an example, the circuitry 195 and the cell(s) 198 can be a battery assembly; noting that a battery assembly can include, alternatively or additionally, one or more other types of circuitry.

A charge rate and/or a discharge rate may be referred to as a C-rate and be specified using a numeric value followed by the capital letter "C". A C-rate specifies the speed a battery is charged or discharged. Speed may be relatively constant for an application(s), function(s), etc., or, for example, speed may vary with respect to time as application(s), function(s), etc., change. As to C-rate, at 1 C, a battery charges and discharges at a current that is on par with a marked Ah rating (e.g., as specified by a manufacturer, etc.). At 0.5 C, the current is half and the time is doubled, and at 0.1 C the current is one-tenth and the time is 10-fold.

The capacity of a battery may be rated with respect to a C-rate, for example, a battery rated at 1 C means that a fully charged battery rated at 1 Ah can be expected to provide 1 A for one hour (h). The same battery discharging at 0.5 C can be expected to provide 500 mA for two hours (2 h), and at 2 C, 2 A for 30 minutes (0.5 h).

As to the term load, it defines the current that is drawn from a battery. Internal battery resistance and depleting state of charge (SOC) can cause voltage to drop under load, which can in some instances trigger an end of discharge (e.g., termination of discharge or discharging). Power relates to current delivery measured in watts (W); energy is the physical work over time measured in watt-hours (Wh).

As to the terms specific energy and gravimetric energy density, these define battery capacity in weight (Wh/kg); whereas, the term volumetric energy density defines battery capacity with respect to volume in liters (Wh/l). As an example, a lithium ion battery may be of a volumetric energy density that is in a range of about 10 Wh/l to more than 1,000 Wh/l.

As mentioned, a cell (e.g., or cells) may be characterized, for example, as to specific energy (e.g., Wh/kg or MJ/kg), energy density (Wh/l or MJ/l), specific power (W/kg), etc. As an example, a region of a battery with one or more cells may include $L_{Cell}$ and $W_{Cell}$ dimensions (e.g., rectangular dimensions), for example, with a $L_{Cell}/W_{Cell}$ ratio in a range of about 1 to about 5. As an example, consider a cell (or cells) with dimensions of about 120 mm ($L_{Cell}$) by about 100 mm ($W_{Cell}$) where, in combination with a height ($H_{Cell}$), a volume ($Vol_{Cell}$) may be calculated. As an example, with a volume ($Vol_{Cell}$) and energy density (ED in Wh/l), an energy value (e.g., Wh) may be determined for the battery.

As an example, a battery with a volume of about 43 ml (~43,000 cubic mm) and a thickness ($H_{cell}$) of about 3.6 mm (e.g., with $L_{cell}$ and $W_{cell}$ of about 120 mm and about 100 mm) may have an energy density of about 480 Wh/l. In terms of energy, such a battery may be capable of storing about 21 Wh, which may be sufficient to power 2.6 W circuitry for about 8 hours (e.g., circuitry operational time).

A cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness of the order of about 0.1 mm; see, e.g., the casing 110 of the battery 100 of FIG. 1). LiPo cells may include a stacked construction formed by stacking materials that include electrode and electrolyte materials in a flat sandwich (e.g., defined by length, width and height dimensions). Stacked layers may be packed in a package (see, e.g., the casing 110 of FIG. 1) in a flat, rolled or other configuration. LiPo cell capacities may include capacities in a range, for example of about 50 mA·hrs (e.g., for a small cell such as for a Bluetooth headset) to about 10 A·hrs or more for an electric vehicle (e.g., electric or hybrid).

Figure 2:
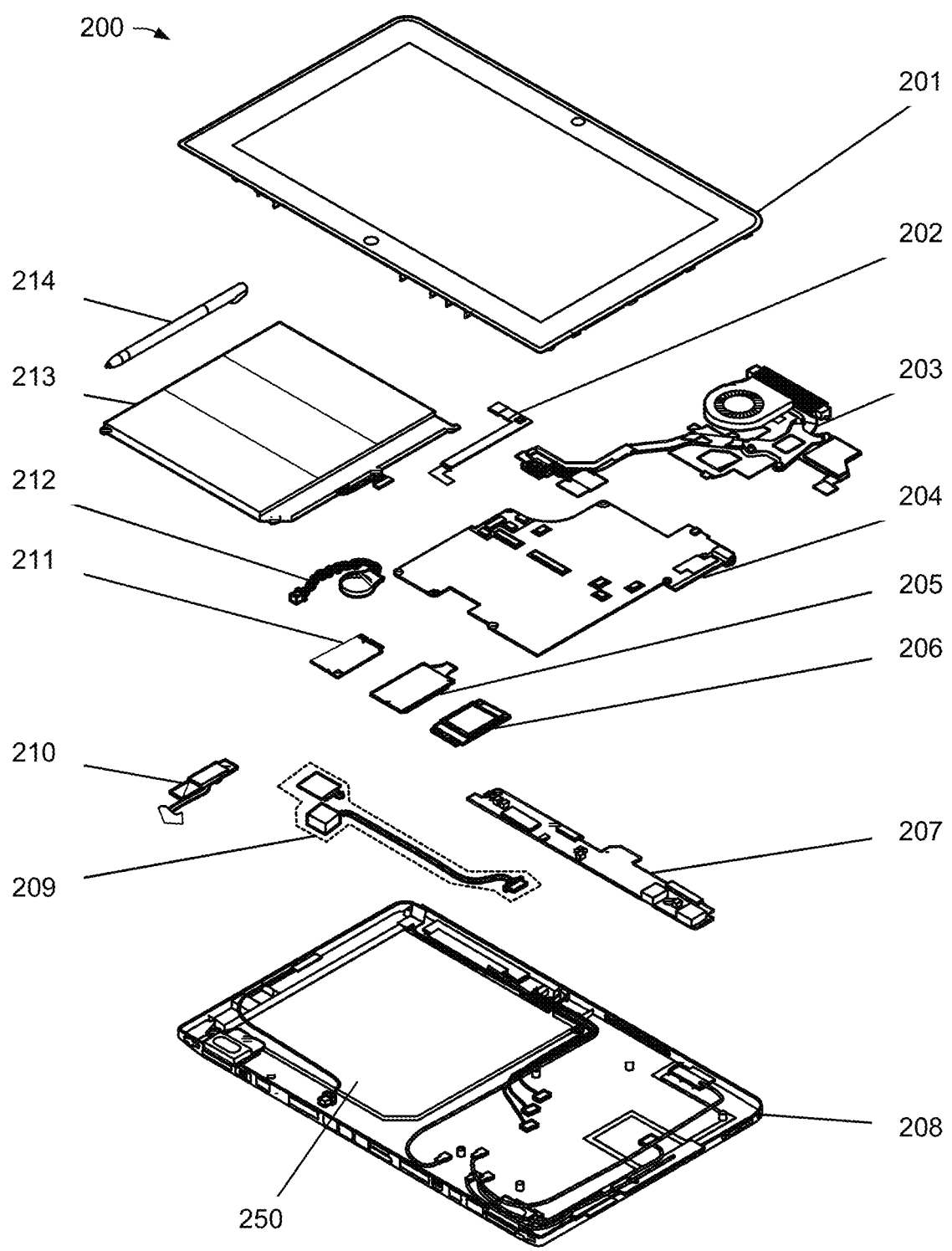
FIG. 2 is a diagram of various components of a device powered by one or more batteries.

FIG. 2 shows an example of a device 200 that includes an LCD assembly 201, a camera assembly 202, a fan assembly 203, a board 204 (e.g., a circuit board, a system board, a motherboard, etc.), a wireless WAN card 205, a wireless LAN card 206, an I/O board 207, a cover assembly 208, a DC cable assembly 209, a communication card 210, a solid-state drive 211, a battery package 213, a stylus 214 and a battery bay 250. In the example of FIG. 2, the board 204 may include a processor and memory, which may be configured to store instructions accessible by the processor and, for example, executable by the processor to perform one or more tasks. In the example of FIG. 2, the battery package 213 may include multiple cells. For example, the battery package 213 may include three sets of cells (e.g., or three cells) such that one is in the middle and surrounded by two others (e.g., two neighbors). In an assembled state, the battery package 213 can be disposed in the battery bay 250, which may be defined by opposing sides (e.g., a top side and a bottom side, where the top side is closer to the display, which can be an LCD of the LCD assembly 201).

Figure 3:
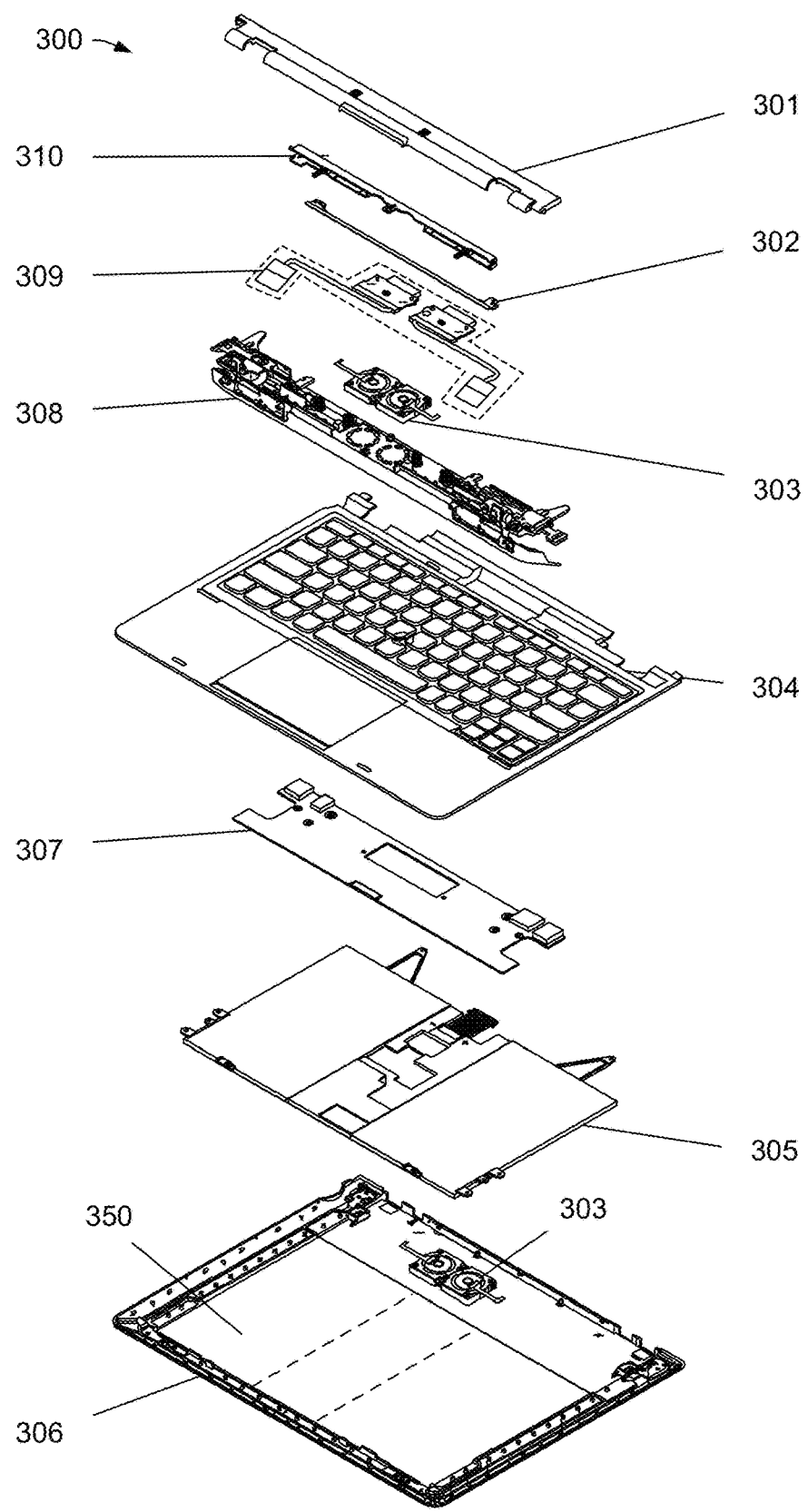
FIG. 3 is a diagram of various components of a device powered by one or more batteries.

FIG. 3 shows an example of a device 300. As an example, the device 300 may be operatively coupled to the device 200. In the example of FIG. 3, the device 300 includes a cover and hinge assembly 301, a link structure 302, a fan assembly 303, a keyboard assembly 304, a battery package 305, a base cover 306, an I/O board 307, a hinge assembly 308, connectors 309, a connectors cover 310, and a battery bay 350. In the example of FIG. 3, the battery package 305 may include multiple cells. For example, the battery package 305 may include two sets of cells (e.g., or two cells). In an assembled state, the battery package 305 can be disposed in the battery bay 350, which may be defined by opposing sides (e.g., a top side and a bottom side, where the top side is closer to a keyboard of the keyboard assembly 304).

A battery package can be secured to a housing via an adhesive material. For example, in FIG. 2, the battery package 213 can be secured in the battery bay 250 by adhesive that binds to the battery package 213 and to the cover assembly 208; and, in FIG. 3, the battery package 305 can be secured in the battery bay 350 by adhesive that binds to the battery package 305 and to the base cover 306. In such examples, the cover assembly 208 can be or include a housing wall (e.g., as a side of the battery bay 250) and the base cover 306 can be or include a housing wall (e.g., as a side of the battery bay 350).

An adhesive can be a substance that is applied to a surface of a component to bind the component to a surface of another component. As an example, an adhesive may be applied to a surface of one component and a surface of another component to bind the surfaces together. As an example, an adhesive or adhesives may be at an interface between two components. As an example, a component may be a substrate with respect to an adhesive, for example, an adhesive can bond two substrates.

As to chemical bonds, a bound state implies a net attractive force between the atoms. Along a spectrum, chemical bonds can be covalent bonds (a bond in which one or more pairs of electrons are shared by two atoms) or ionic bonds (a bond in which one or more electrons from one atom are removed and attached to another atom, resulting in positive and negative ions which attract each other). Other types of bonds include metallic bonds and hydrogen bonding. Also, attractive forces between molecules in a liquid can be characterized as van der Waals bonds.

As to integrity of an adhesive bond between two substrates, if the adhesive changes properties over time, the integrity of the adhesive bond may diminish. For example, a change may occur in chemical composition of an adhesive over time via one or more of chemical reaction, diffusion, absorption, etc. As an example, oxidation may occur that acts to break bonds, diffusion of a solvent may occur that makes bonds more brittle, absorption of moisture may occur that weakens bonds, etc. As an example, an adhesive may be sensitive to temperature such that the integrity and/or one or more other characteristics of the adhesive changes, which may be reversible or irreversible.

Figure 4:
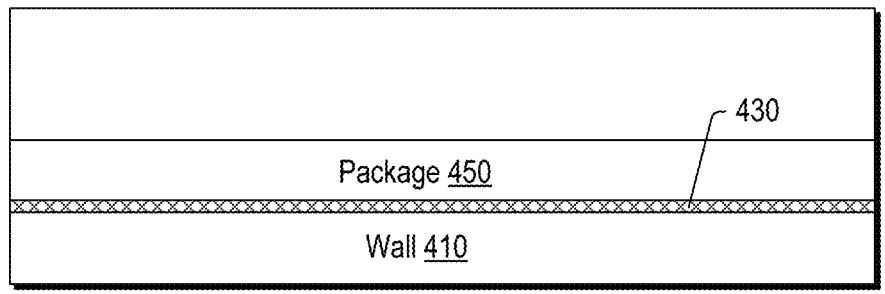
FIG. 4 is a diagram of an assembly and examples of modes of failure.
Figure 4:
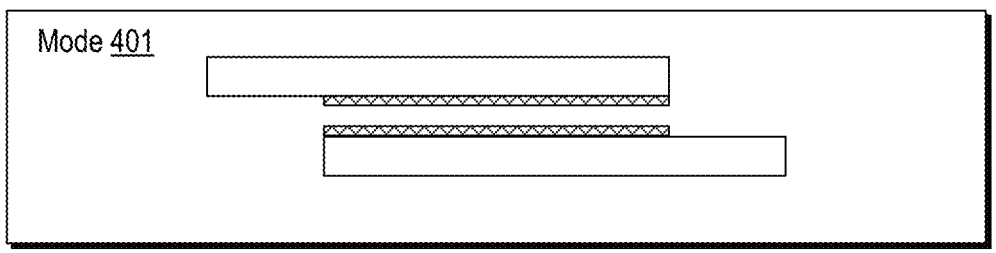
Figure 4:
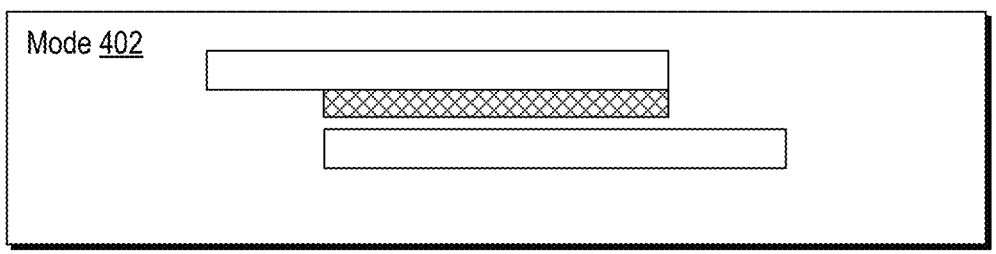
Figure 4:
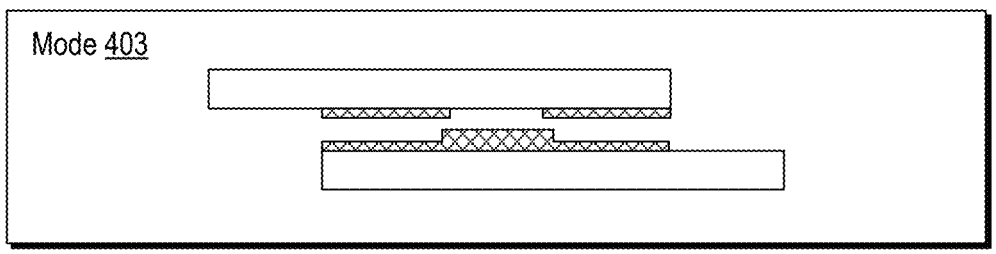
Figure 4:
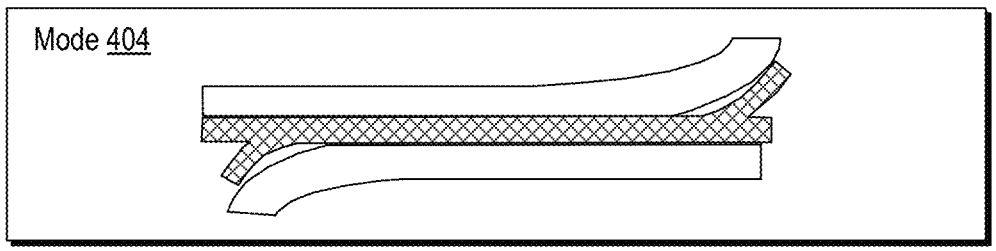

FIG. 4 shows an example of an assembly 400 that includes a wall 410, an adhesive 430 and a package 450 where the adhesive 430 binds the package 450 to the wall 410. In such an example, the adhesive 430 may be of a composition that aims to avoid or otherwise withstand one or more modes of failure 401, 402, 403 and 404.

The mode 401 is a cohesion failure where the adhesive is fractured. The mode 402 is an adhesion failure where the adhesive separates from a surface of one or more of the adherends (e.g., substrates). The mode 403 is a mixed-mode failure that is a variable combination of adhesion failure and cohesion failure. The mode 404 is peel failure where cleavage of a joint occurs by out-of-plane forces.

To overcome such modes of failure, a strong adhesive may be utilized. A strong adhesive may be utilized to make a bond that is considered to be permanent. For example, where a device has an intended lifespan that is less than or equal to a life of a battery that powers the device and that is in a housing of the device, the battery may be adhered to the housing using a bond that is considered permanent. In such a scenario, there is no intention by the manufacturer to allow for replacement of the battery. In such an example, removal of the battery may cause damage to one or more substrates such as the housing as a substrate and/or an outer layer of the battery as a substrate. Where the battery has a casing such as the casing 110 of the battery 100 of FIG. 1, damage to the casing may present one or more hazards. For example, chemicals contained with the casing may, upon damage to the casing, react in an undesirable manner, which may cause emission of heat, emission of vapor, an increase in pressure, etc. As to a breach in the casing, one or more chemicals may leak from the battery.

In some instances, a device can include a battery that is intended to be replaceable (e.g., consider a smartphone battery). However, in such instances, an adhesive may be strong in that a housing of the device may be undamaged while the battery is damaged, which may present risk of hazard(s).

As an example, one or more materials can be utilized to create a balance between adhesion and replaceability of a battery as in the form of a battery package in a battery bay of a device.

As an example, a thermoplastic may be utilized for adhering a battery package to a substrate that is at least part of a battery bay (e.g., a side or wall of a battery bay). For example, a thermoplastic may be utilized to form a bond that binds the casing 110 of the battery 100 to a surface of a housing to secure the battery package to the housing. In such an example, the thermoplastic can be heated to a predetermined temperature such that the strength of the bond diminishes to reduce risk of damage upon separating the battery package from the surface of the housing.

A thermoplastic, or thermosoftening plastic, is a plastic material, a polymer, that becomes pliable or moldable above a specific temperature and solidifies upon cooling. Thermoplastics tend to have relatively high molecular weights. In a thermoplastic, polymer chains associate through intermolecular forces, which weaken relatively rapidly with increased temperature, for example, to transition to a state that may be a viscous liquid state. Thermoplastics differ from thermosetting polymers, which form irreversible chemical bonds during a curing process. Thermosets do not melt when heated: they decompose and do not reform upon cooling.

Above a glass transition temperature and below a melting point, physical properties of a thermoplastic change without an associated phase change. Some thermoplastics do not fully crystallize below the glass transition temperature, retaining some or all of their amorphous characteristics. Amorphous and semi-amorphous plastics tend to be less resistant to chemical attack and environmental stress cracking because as they lack a crystalline structure.

The glass-transition temperature Tg of a material characterizes the range of temperatures over which this glass transition occurs. The glass-transition temperature Tg is lower than the melting temperature, Tm, of the crystalline state of the material, if one exists.

As an example, brittleness of a thermoplastic can be decreased with addition of one or more materials referred to as plasticizers, which can increase the mobility of amorphous chain segments to effectively lower the glass transition temperature. Modification of thermoplastic polymers through copolymerization or through the addition of non-reactive side chains to monomers before polymerization can also lower the glass transition temperature. As an example, a thermoplastic may include linear or slightly branched long chain molecules that provide for characteristics to repeatedly soften on heating and harden on cooling.

As an example, a material may be a composite material such as a thermoplastic with one or more synthetic polymers where "weakest link" and adhesion strength can be controlled by temperature. For example, one or more synthetic polymers may be adhesives that have a desired bond strength over a particular temperature range while a thermoplastic may provide for weakening at temperatures above the particular temperature range. As an example, a thermoplastic can form a material matrix for one or more adhesive materials where the properties of the material matrix can be largely controlled via temperature in relationship to the glass transition temperature of the thermoplastic.

A thermoplastic can be made of long, unlinked polymer molecules, generally with a high molecular weight. As the molecular chains can be unlinked, they can rely one or more types of other interactions, such as dipole-dipole interactions, aromatic ring stacking, or Van der Waals forces. Thermoplastics generally form a crystalline structure when cooled below a certain temperature, resulting in a smooth surface finish and significant structural strength. Above this temperature, thermoplastics tend to be elastic. As temperature increases further, thermoplastics tend to gradually soften. At even higher temperatures, thermoplastics can melt.

As mentioned, material properties of a thermoplastic can be adjusted, for example, to meet specifications of an application. Such adjustments may be by blending a thermoplastic (e.g., thermoplastic resin) with one or more other materials. As mentioned, one or more plasticizers can be added to a thermoplastic polymer to keep the material flexible at lower temperatures.

Some examples of thermoplastics include polyethylene, polypropylene, polyvinyl chloride (PVC), polystyrene, polytetrafluoroethylene (PTFE), acrylonitrile butadiene styrene (ABS plastic), and polyamide.

Figure 5:
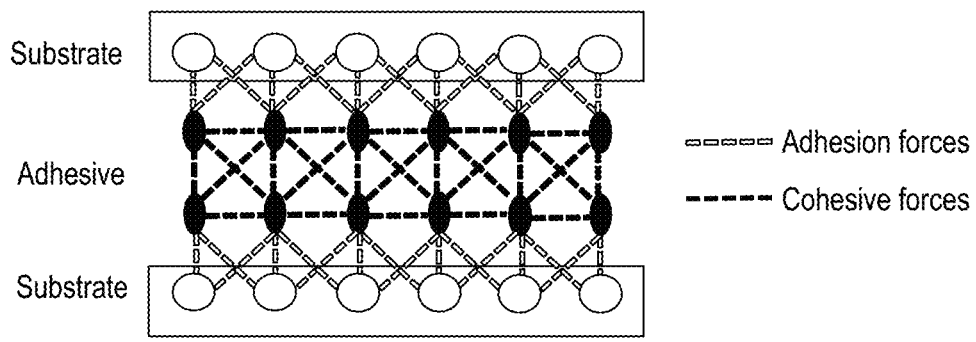
FIG. 5 is a series of diagrams that include examples of bound substrates.
Figure 5:
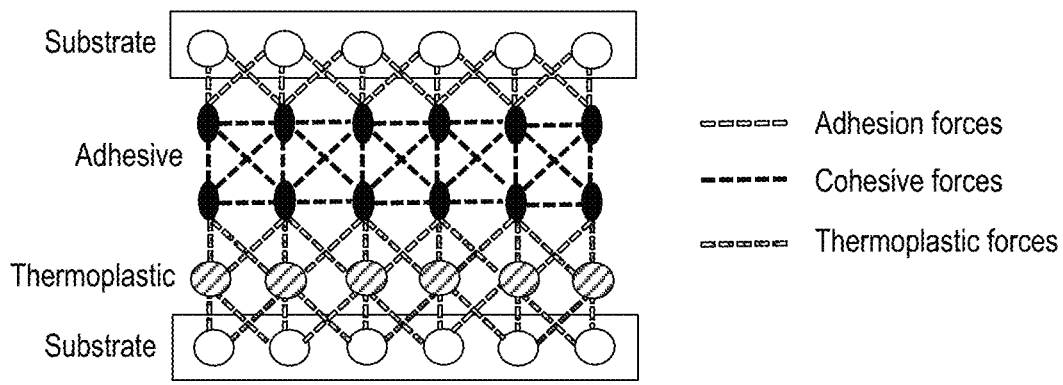
Figure 5:
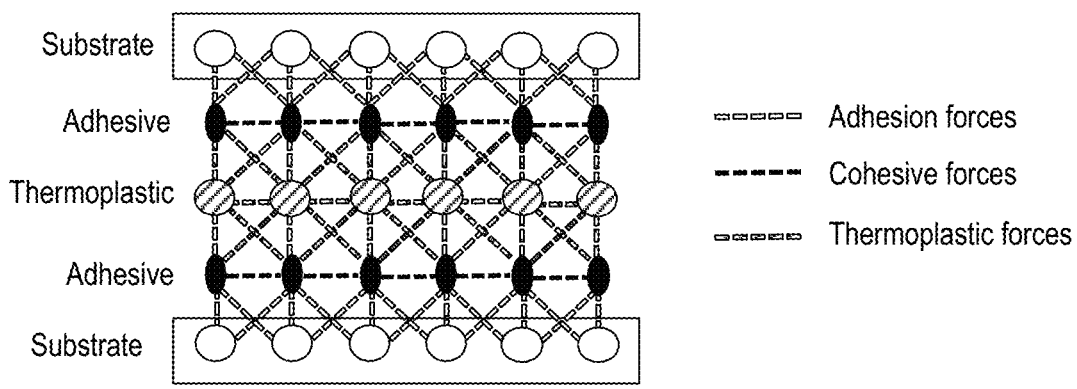

FIG. 5 shows examples of assemblies 500, 501 and 503 where the assemblies 501 and 503 include at least one thermoplastic, which may be present as a contiguous layer or in another spatial configuration.

As shown in FIG. 5, the assembly 500 includes two substrates and adhesive where a combination of adhesion forces and cohesive forces provide for bonding the two substrates.

As shown in FIG. 5, the example assembly 501 includes thermoplastic forces in addition to adhesion forces and cohesive forces. As shown, a thermoplastic as a material is adjacent to one of the substrates. As an example, the thermoplastic may be positioned closer to one substrate than the other substrate. For example, where one substrate generates heat during operation (e.g., via electricity in circuitry being transformed to heat energy) and the other substrate does not, the thermoplastic may be closer to the substrate that does not generate heat. In such an example, the thermoplastic may be less affected by the heat generation. Further, in such an example, where the one substrate is closer to an exterior of a device, the thermoplastic may be heated via that substrate. For example, consider the cover assembly 208 of FIG. 2 being placed on a heating pad such that heat energy causes a rise in temperature of a thermoplastic that is disposed between the cover assembly 208 and the battery package 213. In such an example, the thermoplastic can be heated to a temperature that allows for tensile extension of the thermoplastic such that the battery package 213 can be separated from the cover assembly 208 for removal of the battery package 213 from the battery bay 250. In such an example, the amount of tensile force can be below a damage force that would damage the battery package 213 and/or the cover assembly 208. In such an example, the temperature may be sufficient to reduce the amount of force by at least several newtons. For example, at room temperature, the amount of force may be ten newtons or more while, at an elevated temperature (e.g., greater than approximately 40 degrees C.), a reduction in the amount of force can be to less than several newtons. In such an example, an even higher temperature may be utilized to further reduce the amount of force (e.g., to less than one newton, etc.).

As an example, the assembly 501 may be utilized with respect to the battery package 305 with respect to the base cover 306 of FIG. 3. In such an example, the battery package 305 may be secured in the battery bay 350 by adhering the battery package 305 to a surface of the base cover 306. In such an example, where it is desirable to remove the battery package 305, heat energy may be transferred to the thermoplastic to soften the thermoplastic to reduce the amount of tensile force to separate the battery package 305 from the base cover 306 to remove the battery package 305 from the battery bay 350. In such an example, the amount of tensile force can be below a damage force that would damage the battery package 305 and/or the base cover 306. In such an example, the temperature may be sufficient to reduce the amount of force by at least several newtons. For example, at room temperature, the amount of force may be ten newtons or more while, at an elevated temperature (e.g., greater than approximately 40 degrees C.), a reduction in the amount of force can be to less than several newtons. In such an example, an even higher temperature may be utilized to further reduce the amount of force (e.g., to less than one newton, etc.).

As an example, the assembly 501 can include a layer of double sided tape (DST) that is adjacent to a substrate on one side and adjacent to another material on the other side where that other material is adjacent to another substrate. For example, consider a stack that includes a first substrate, thermoplastic, DST, and a second substrate. In such an example, the thermoplastic may be the "weakest link" and a release material for releasing the substrates upon heating the thermoplastic to an elevated temperature (e.g., greater than approximately 40 degrees C., etc.). As an example, an elevated temperature may be a temperature that is greater than an operating temperature of a device that is reached during operation of the device by operation of the device (e.g., the device consuming power and heating up).

In the example assembly 503, the thermoplastic is disposed between adhesive for at least a portion of a spatial region between the substrates. The example assembly 503 may be utilized for the battery package 213 of FIG. 2 and/or the battery package 305 of FIG. 3.

As an example, the assembly 503 may be assembled through use of a thermoplastic that is disposed between two layers of DST. For example, a stack can include a first substrate, a composite layer of thermoplastic disposed between two layers of DST, and a second substrate. In such an example, the thermoplastic may be the "weakest link" and a release material for releasing the substrates upon heating the thermoplastic to an elevated temperature (e.g., greater than approximately 40 degrees C., etc.). As an example, an elevated temperature may be a temperature that is greater than an operating temperature of a device that is reached during operation of the device by operation of the device (e.g., the device consuming power and heating up).

As an example, a DST can include an internal layer that is a thermoplastic layer that upon reaching a pre-determined temperature allows for separation of the sides of the DST.

As an example, a substrate upon which a thermoplastic resides, directly or indirectly, may be of a material with a high thermal coefficient such that heat energy may be transferred to the thermoplastic. For example, consider a metal case, a metal housing, etc., that may transfer heat energy from an exterior surface to an interior surface to thereby heat the thermoplastic for purposes of softening the thermoplastic for release of a battery from a battery bay. As an example, a thermoplastic may be a composite material with one or more components that may be other than polymeric that increase heat transfer. For example, consider one or more metallic and/or ceramic types of components that can increase heat transfer of a thermoplastic.

As an example, a thermoplastic may be characterized by a thickness. As an example, a thickness may be less than approximately 1 mm. As an example, a thickness may be less than approximately 0.5 mm. As an example, a thickness may be less than approximately 0.1 mm. As an example, a thickness may be less than approximately 0.05 mm. As an example, a thickness may be less than approximately 0.01 mm. As an example, a thickness may be of the order of a few microns. As an example, thermoplastic may be deposited at one or more thicknesses.

Figure 6:
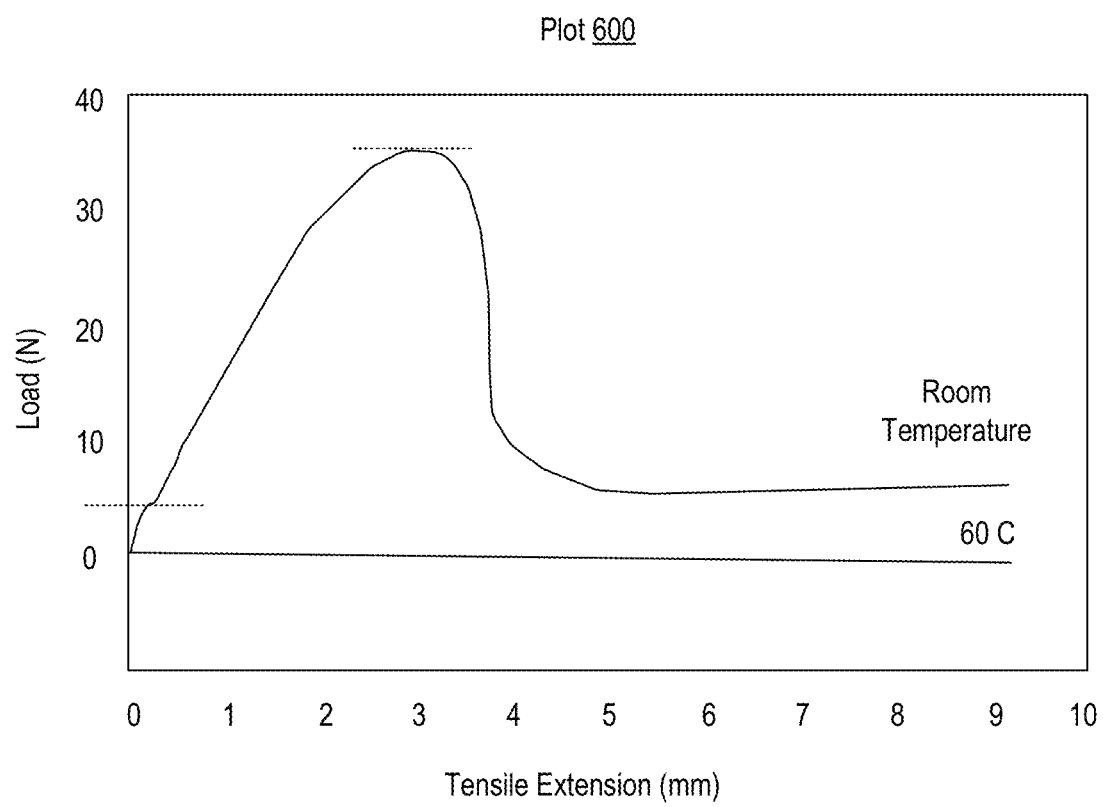
FIG. 6 is a diagram of a plot of load versus tensile extension.

FIG. 6 shows a plot 600 of data of load versus tensile extension as measured on an Instron machine. Such a machine may be utilized to measure ultimate tensile strength (UTS), often shortened to tensile strength (TS). Tensile strength is the capacity of a material or structure to withstand loads tending to elongate, as opposed to compressive strength, which withstands loads tending to reduce size. In other words, tensile strength resists tension (being pulled apart); whereas, compressive strength resists compression (being pushed together). Ultimate tensile strength is measured by the maximum stress that a material can withstand while being stretched or pulled before breaking.

In the plot 600, assemblies that included thermoplastic and adhesive disposed between two substrates were subjected to tensile force. In one trial, one of the assemblies was subjected to force while the thermoplastic was at room temperature (e.g., approximately 25 degrees C.) and in another trial, another one of the assemblies (of the same construction) was subjected to force while the thermoplastic was at a temperature of approximately 60 degrees C. As shown, for the room temperature assembly, some amount of tensile extension occurred for a load up to about 6 N where some breakage occurred followed by further tensile extension at greater force until a maximum in force occurred at approximately 35 N, with a tensile extension of about 3 mm. As to the elevated temperature trial, minimal force resulted in tensile extension without observation of breakage or maximum force. Such behavior is a result of the thermoplastic behaving like a viscous liquid at the elevated temperature where the thermoplastic is the weakest link in the bond between the substrates of the assembly.

The data of the plot 600 demonstrate how a weakest link approach that utilizes thermoplastic can allow for acceptable adhesion at ambient temperature (e.g., room temperature) and can allow for removable of a battery (e.g., a battery package) from a substrate at an elevated temperature with an amount of force that does not give rise to a significant risk of damaging one or more substrates (e.g., a battery casing, a housing, a cover, etc.).

As an example, a display assembly such as an LCD assembly may be secured in a display housing via one or more adhesives and at least one layer of thermoplastic. In such an example, where the display assembly is to be removed, heat energy may be applied to raise the temperature of the thermoplastic to reduce the amount of force to below a level that may risk damage to the display assembly or one or more other components. As an example, one or more approaches as explained with respect to FIG. 5 may be utilized, for example, where one of the substrates is a display, a display assembly, etc. While a battery package and display or display assembly are mentioned, one or more other types of components may be secured in a removable manner. For example, consider one or more of the components in the examples of FIG. 2 and FIG. 3 being removably secured in a housing.

As mentioned, a thermoplastic may be characterized by a glass-transition temperature. A glass-transition temperature may be measured via differential scanning calorimetry (DSC). The glass transition temperature (Tg) depends on the chemical structure of the polymer and can therefore be used to identify polymers. The Tg temperature is, however, lowered by the addition of plasticizers. Moisture can also act as a plasticizer. In the glass transition range, the specific heat of a polymer increases by 0.1 to 0.4 J/gK thereby causing a step in the DSC curve. Frequently, an endothermic peak (relaxation peak) is observed. This is caused by enthalpy relaxation that occurs during storage at temperatures below that of the glass transition. Above the glass temperature, some polymers may become crystalline, e.g. PET.

Figure 7:
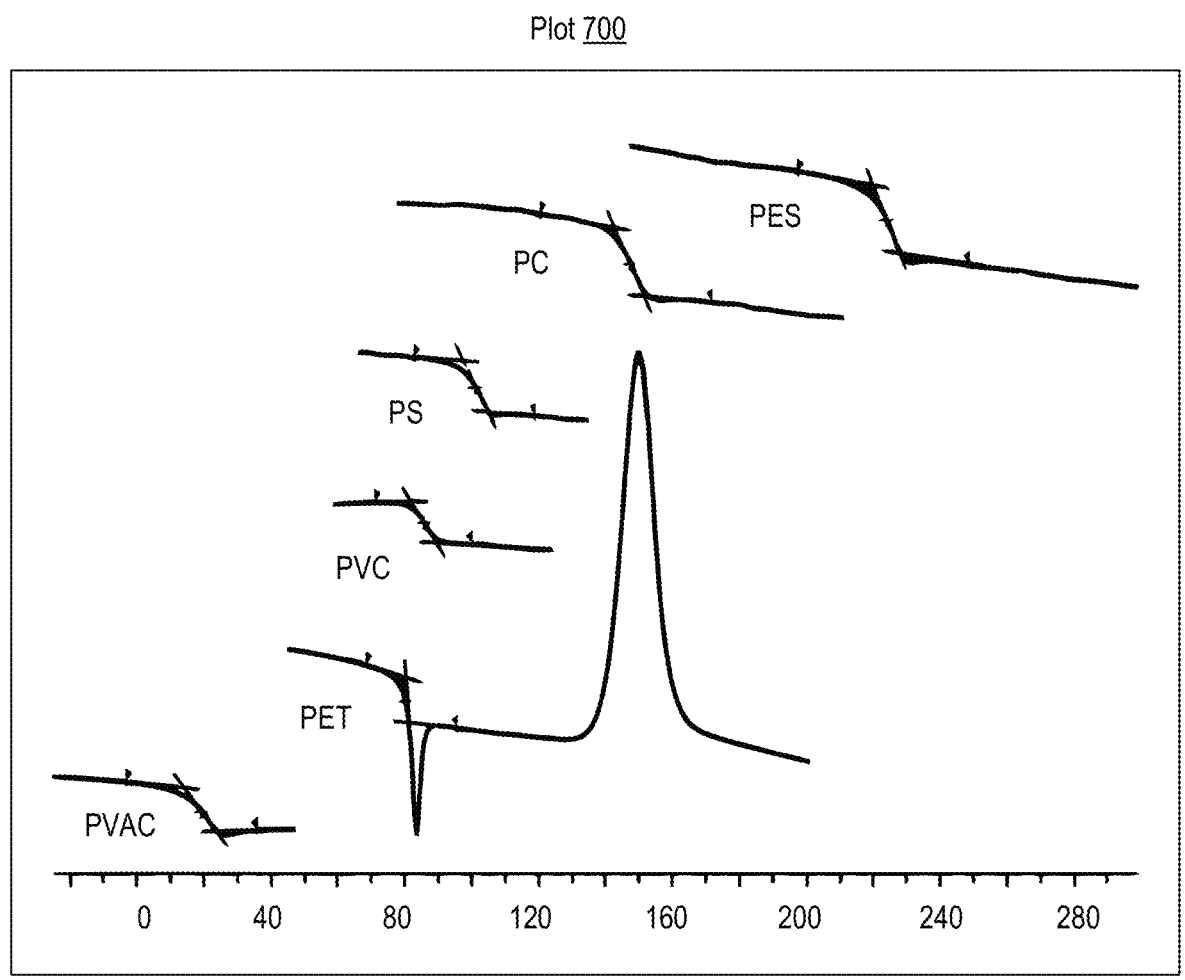
FIG. 7 is a diagram of a plot of differential scanning calorimetry (DSC) results for examples of a thermoplastics.

FIG. 7 shows an example plot 700 of DCS glass-transition temperature measurements. As shown, different thermoplastics exhibit different glass-transition temperatures. As an example, a material may be selected based on a glass-transition temperature for use in an assembly such as the assembly 501 or the assembly 503. As an example, a blend of materials may be utilized to achieve a desired release temperature for a battery from a substrate. As mentioned, Tg may be lowered by the addition of one or more types of plasticizers.

As an example, relative humidity may be increased where moisture may act as a plasticizer for purposes of control of Tg. As an example, where a substrate is porous or otherwise has openings, moisture may be introduced where the moisture may contact a thermoplastic to act as a plasticizer to lower the glass-transition temperature for purposes of facilitating release of another substrate. As an example, the cover assembly 208 and/or the base cover 306 may be porous or otherwise include openings over a portion of surface area that provides area for adhering the battery package 213 or the battery package 305, respectively.

Knowledge of a thermoplastic's viscoelastic behavior over a wide frequency and temperature range allows information to be gained about mechanical properties relevant to its application, and also about molecular rearrangement and structures. As an example, dynamic mechanical analysis (DMA) may be performed on one or more materials that can be utilized for bonding a battery to a substrate in a reversible manner.

As an example, a battery removal process may employ heat energy, force and optionally frequency. As to frequency, a frequency of applied force may facilitate separation of one substrate from another, for example, based on relaxation and/or other characteristics of adhesive material, which can be or include one or more polymers.

Figure 8:
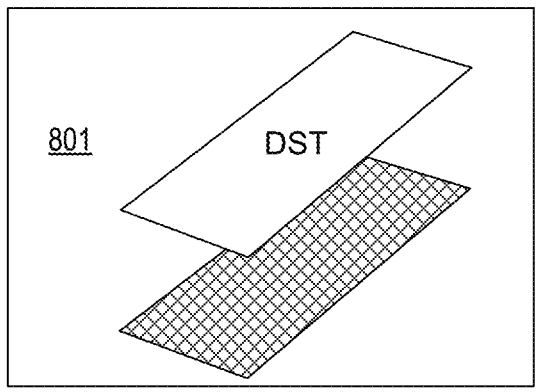
FIG. 8 is a series of diagrams of examples of stacks of material.
Figure 8:
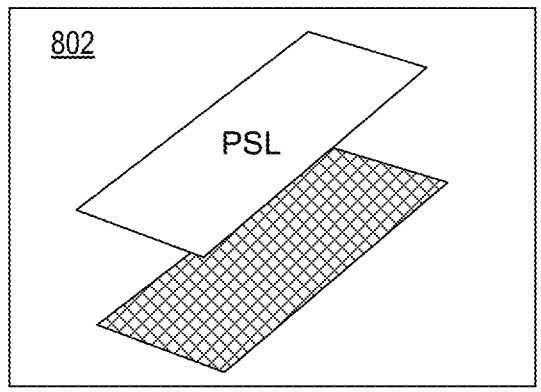
Figure 8:
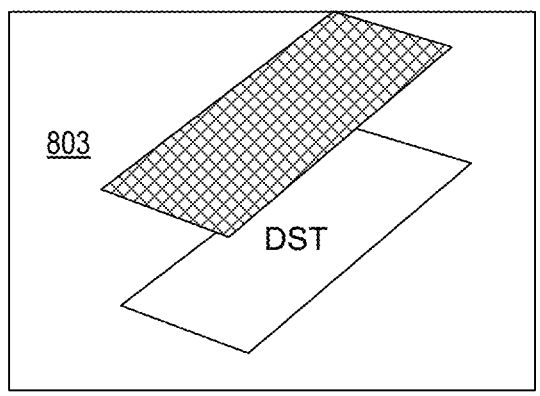
Figure 8:
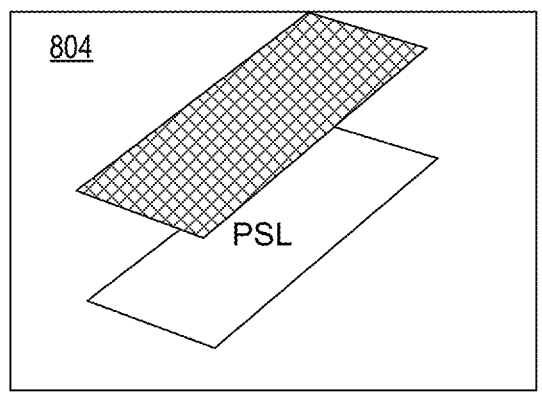
Figure 8:
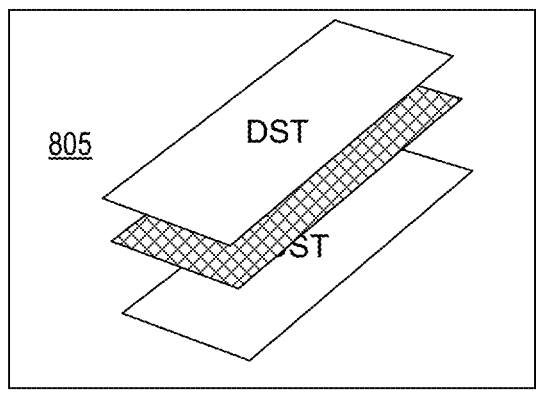
Figure 8:
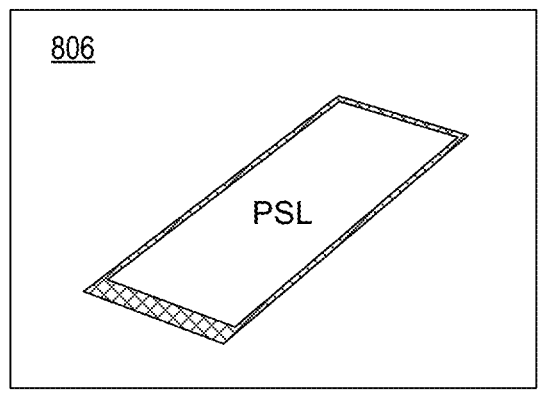

FIG. 8 shows various examples of assemblies 801, 802, 803, 804, 805 and 806 in the form of stacks of material. In the examples of FIG. 8, a double sided tape (DST) is illustrated and a pressure sensitive layer (PSL) is illustrated. As to a PSL, it can include pressure-sensitive adhesive (PSA) that is an adhesive which forms a bond when pressure is applied to marry the adhesive with the adherend. As the name "pressure-sensitive" indicates, a degree of bond can be influenced by the amount of pressure which is used to apply the adhesive to a surface.

Figure 9:
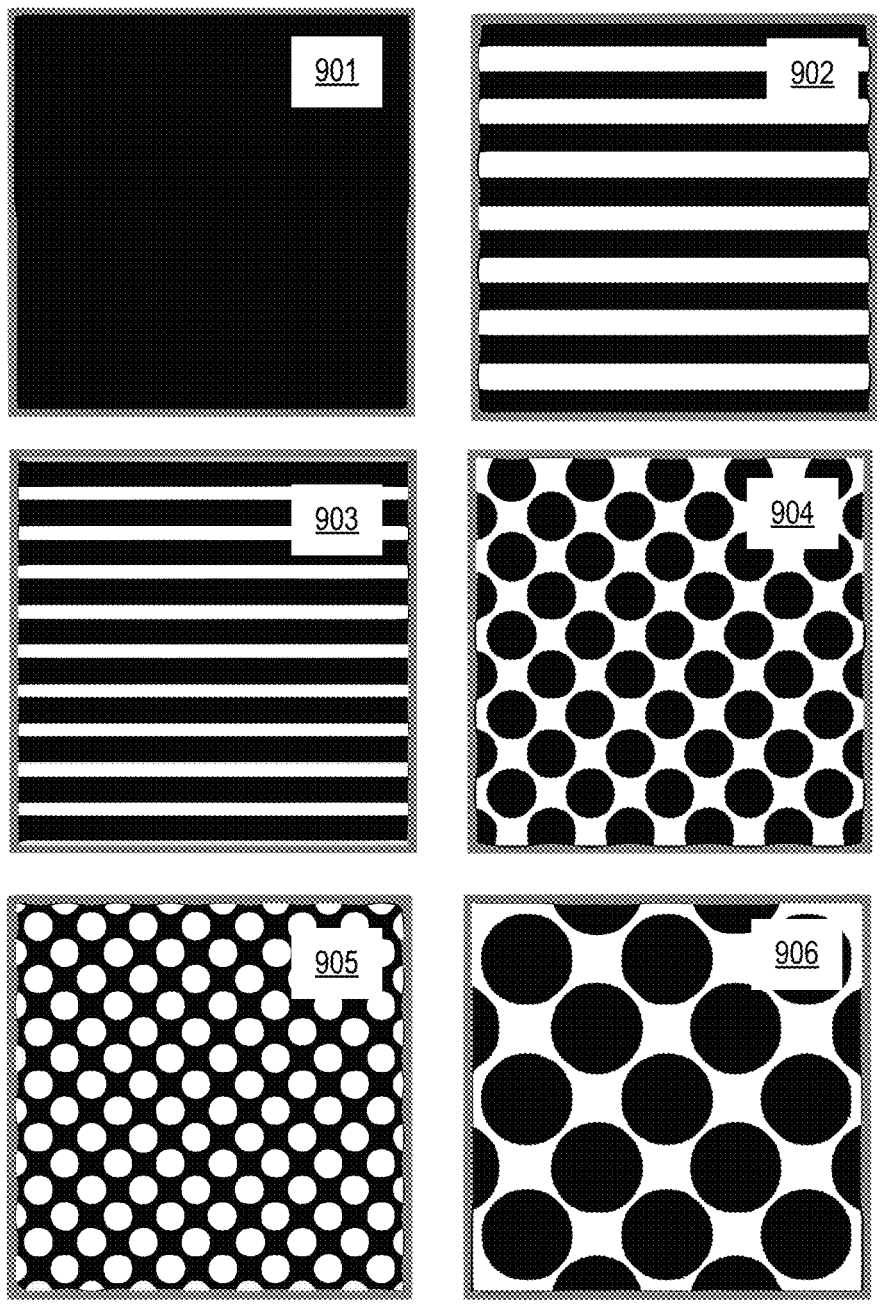
FIG. 9 is a series of diagrams of examples of deposition patterns for material.

FIG. 9 shows various patterns of material 901, 902, 903, 904, 905 and 906 that may be disposed between two substrates. As an example, a pattern may be formed via a mask, a stencil, a depositing tool, etc. As an example, a mask may be laid over a substrate and mask sprayed over such that openings in the mask allow for deposition of material onto the substrate. In such an example, the material may be a temperature sensitive release material. For example, consider a thermoplastic or a wax.

As to a wax, it may be one of a diverse class of organic compounds that are lipophilic, malleable solids above a particular temperature. Waxes can include higher alkanes and lipids, for example, with melting points above approximately 40 degrees C. that can melt to form liquids. Waxes tend to be insoluble in water and soluble in organic, nonpolar solvents. As an example, a wax may be utilized as a moisture barrier, for example, as a type of caulking in an assembly where two substrates are bound together via an adhesive or adhesives. As an example, a wax may be utilized as a thermally sensitive material that is disposed between an adhesive and a substrate where the wax may be a "weakest link" at a particular temperature for purposes of releasing bound substrates.

As an example, where an adhesive includes a volatile material, one or more sealants may be utilized to help keep the volatile material from escaping and/or to reduce its escape. For example, some adhesives become brittle when volatile components are lost through evaporation, etc. As an example, a thermoplastic material may be utilized at least in part as a barrier material or a sealant to help reduce loss of one or more volatile components from an adhesive or adhesives. For example, consider a battery package that can be defined by a perimeter where a material can be disposed about the perimeter to help reduce loss of one or more volatile components of an adhesive. In such an example, the material disposed about the perimeter may be a thermoplastic and/or a wax. In either instance, they may at lower temperatures enhance adhesion while at elevated temperatures not interfere with release of the battery package where the battery package is bound to another substrate with a same and/or a different temperature sensitive release material. As an example, a temperature sensitive release material is a material that can be in a stack along with one or more adhesives where the temperature sensitive release material is a weakest link in the stack as to tensile force (e.g., and/or other force) at a temperature that does not have a substantial impact on the strength of the bond(s) formed by the one or more adhesives.

As an example, a ring of material may be disposed around a battery package or another component where the ring of material is a barrier that hinders drying of a material that is disposed inwardly of the ring. As an example, a component may be defined by a perimeter where a ring of material seals the perimeter. As an example, the ring of material can be referred to as a caulk or caulking that can fill one or more gaps and/or edges to reduce escape of volatile components from an adhesive and/or that can reduce absorption of water by the adhesive (e.g., to reduce effects of high relative humidity or other sources of moisture, etc.).

Referring again to FIG. 9, material may be applied to a substrate and/or an adhesive (e.g., a tape, etc.) according to one or more of the patterns 902, 903, 904, 905 and 906 at a low temperature, which may be an ambient temperature. In such an example, adhesive may be utilized to bind to substrates. In such an example, upon application of heat energy to increase the temperature of the material, the material may change shape. For example, the dots of the pattern 904 may spread as the material becomes more fluid where spreading is accompanied by thinning and a reduction in tensile force required to separate one substrate from another substrate.

As an example, a thermoplastic and/or a wax may be utilized for removable components to facilitate their removal. As an example, a thermoplastic and/or a wax may be suitable for reinstallation. For example, consider heating a thermoplastic to make it softer, installing the component and then allowing the thermoplastic to cool such that the thermoplastic becomes less elastic (see, e.g., the plot 600 of FIG. 6).

Figure 10:
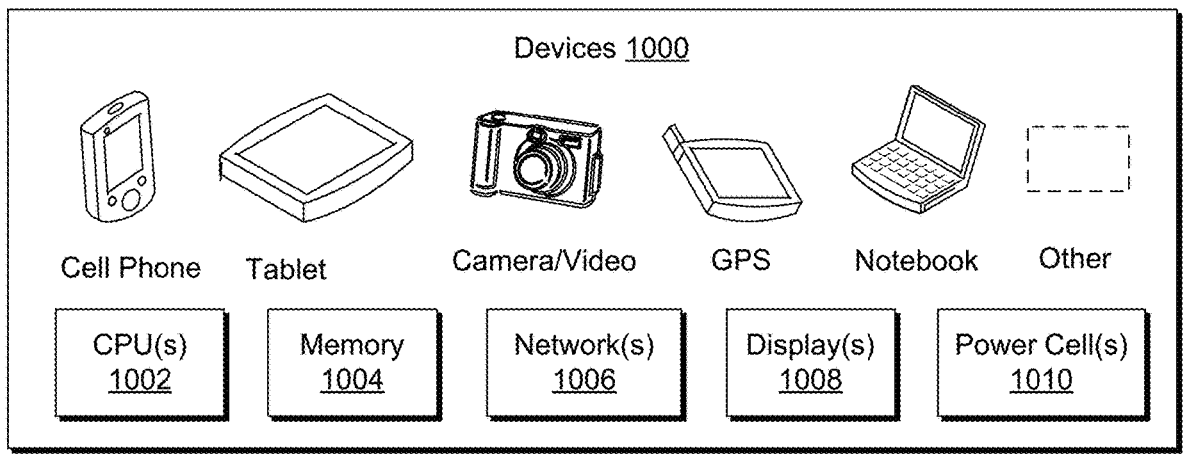
FIG. 10 is a diagram of examples of devices.
Figure 10:
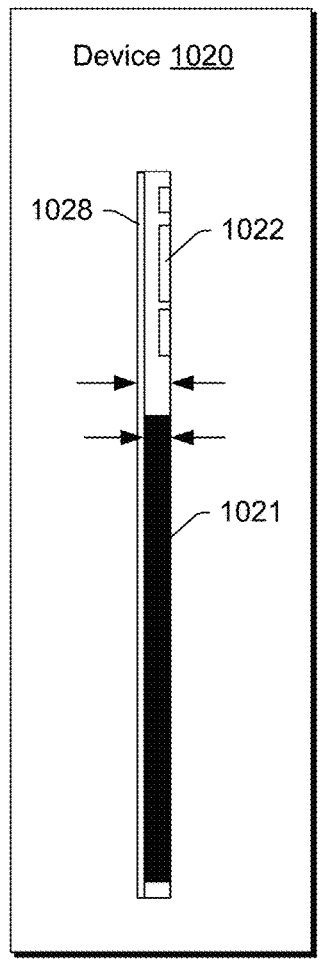

FIG. 10 shows some examples of devices 1000 that may be powered by a lithium-ion cell or cells (e.g., in the form of a lithium-ion battery or batteries). For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 1002, memory 1004, one or more network interfaces 1006, one or more displays 1008 and, as a power source, one or more lithium-ion cells 1010.

As an example, a device 1020 may include a power cell(s) 1021, circuitry 1022 and, for example, a display 1028. In such an example, the thickness of the device 1020 may be determined largely by a thickness of the power cell(s) 1021. For example, about 80 percent of the overall thickness of the device 1020 may be determined by a thickness of the power cell(s) 1021.

As an example, one or more of the devices 1000 may utilize a thermoplastic and/or a wax to allow for ease of removal of one or more components of such devices. Removal of a component may be for purposes of replacement of that component (e.g., battery replacement, display replacement, etc.) and/or to gain access to another component to be serviced, replaced, etc.

As an example, a device can include a processor; memory accessible by the processor; a battery bay that includes a first surface; a battery package disposed in the battery bay and operatively coupled to the processor, where the battery package includes a second surface; and materials disposed between the first surface and the second surface, where the materials include an adhesive and a thermoplastic. In such an example, the thermoplastic can have a glass-transition temperature greater than approximately 40 degrees C. and less than approximately 120 degrees C.

As an example, materials disposed between surfaces can include an adhesive, a thermoplastic and a plasticizer that lowers a glass-transition temperature of the thermoplastic.

As an example, an adhesive can be a double sided tape (DST). Such an adhesive can include a thermoplastic between the two sides where the two sides are adhesive sides. In such an example, upon heating of the thermoplastic, the two sides may become separable.

As an example, an adhesive can be disposed between a thermoplastic and a surface of a component, which may be, for example, a battery package, a display, or other component of a computing device (see, e.g., the devices 1000 of FIG. 10).

As an example, a thermoplastic may be deposited as a continuous layer. As an example, a thermoplastic may be deposited in pattern.

As an example, a component of a device can have a perimeter where a material can be disposed about the perimeter. In such an example, the material disposed about the perimeter can be wax. As an example, an adhesive that adheres to a surface can include a volatile component where wax hinders transport of the volatile component.

As an example, a battery package can include at least one lithium-ion cell. As an example, a battery package can include a flexible pouch. In such an example, the flexible pouch can be a flexible aluminum foil laminate pouch.

As an example, a device can include a display operatively coupled to a processor where the display and the processor can be powered by a battery of a battery package. In such an example, the device can be, for example, a smart phone, a tablet computing device or a laptop computing device.

As an example, a battery package can be of a maximum thickness less than approximately 10 mm or, for example, of a maximum thickness less than approximately 5 mm.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 11:
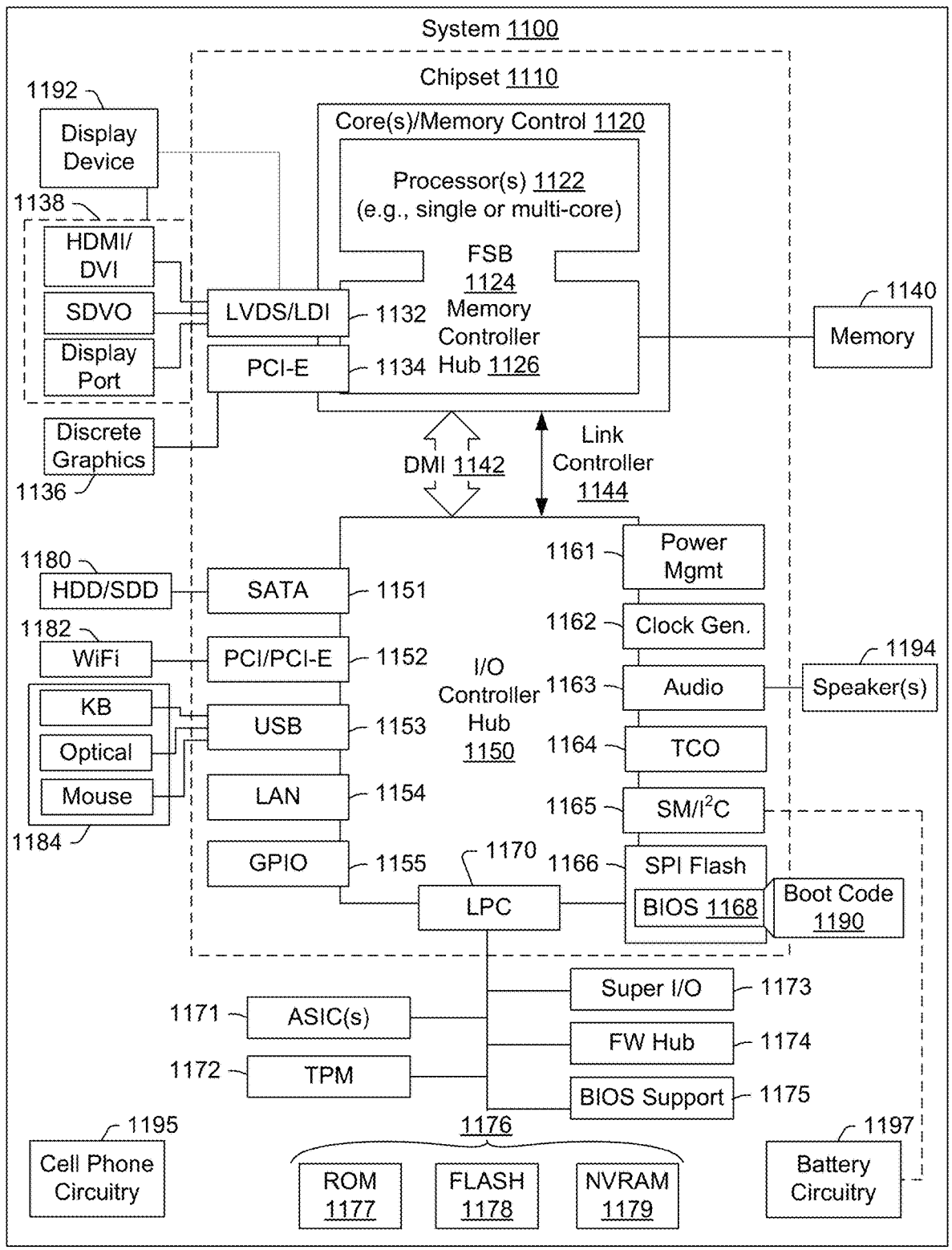
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As described herein, a device such as in FIG. 2, FIG. 3, FIG. 10, etc., may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and nonvolatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
    a processor;
    memory accessible by the processor;
    a battery bay that comprises a first surface;
    a battery package disposed in the battery bay and operatively coupled to the processor, wherein the battery package comprises a second surface; and
    materials disposed between the first surface and the second surface, wherein the materials comprise a first pressure sensitive adhesive, thermoplastic and a second pressure sensitive adhesive, wherein the first pressure sensitive adhesive binds the first surface and the thermoplastic, and wherein the second pressure sensitive adhesive binds the thermoplastic and the second surface.

2. The device of claim 1 wherein the thermoplastic comprises a glass-transition temperature greater than approximately 40 degrees C. and less than approximately 120 degrees C.

3. The device of claim 1 wherein the materials comprise a plasticizer that lowers the glass-transition temperature of the thermoplastic.

4. The device of claim 1 wherein the first pressure sensitive adhesive, the thermoplastic and the second pressure sensitive adhesive form a double sided tape (DST).

5. The device of claim 1 wherein the first pressure sensitive adhesive is a double sided tape (DST).

6. The device of claim 1 wherein the second pressure sensitive adhesive is a double sided tape (DST).

7. The device of claim 1 wherein the thermoplastic is deposited as a continuous layer.

8. The device of claim 1 wherein the thermoplastic is deposited in a pattern that comprises shaped features and wherein, responsive to application of heat energy that increases temperature of the thermoplastic beyond its glass-transition temperature, the shaped features spread and decrease thickness to reduce tensile force required to separate the battery package from the first surface.

9. The device of claim 1 wherein the battery package comprises a perimeter and wherein a material is disposed about the perimeter.

10. The device of claim 9 wherein the material disposed about the perimeter comprises a wax, wherein at least one of the first pressure sensitive adhesive and the second pressure sensitive adhesive comprises a volatile component and wherein the wax hinders transport of the volatile component at the perimeter to reduce loss of the volatile component from the adhesive.

11. The device of claim 1 wherein the battery package comprises at least one lithium-ion cell.

12. The device of claim 1 wherein the battery package comprises a flexible pouch.

13. The device of claim 12 wherein the flexible pouch is a flexible aluminum foil laminate pouch.

14. The device of claim 1 comprising a display operatively coupled to the processor.

15. The device of claim 1 comprising a smart phone.

16. The device of claim 1 comprising a tablet computing device.

17. The device of claim 1 comprising a laptop computing device.

18. The device of claim 1 wherein the battery package comprises a maximum thickness less than approximately 10 mm.

19. The device of claim 1 wherein the battery package comprises a maximum thickness less than approximately 5 mm.

* * * * *